United States Patent [19]

Collins

[11] 3,731,234

[45] May 1, 1973

[54] COMBINED VOICE FREQUENCY TRANSMISSION AND DC SIGNALING CIRCUIT

[75] Inventor: Russell William Collins, Holmdel, N.J.

[73] Assignee: Bell Telephone Laboratories, Incorporated, Murray Hill, N.J.

[22] Filed: Dec. 27, 1971

[21] Appl. No.: 212,364

[52] U.S. Cl. ..........................333/1, 333/5, 333/12, 333/25

[51] Int. Cl. ..........................H04b 3/28, H03h 7/42

[58] Field of Search..........................333/1, 5, 12, 25, 333/28, 24, 27, 11, 4; 179/78

[56] References Cited

UNITED STATES PATENTS

| | | | |
|---|---|---|---|
| 2,253,189 | 8/1941 | Mechling | 179/78 R X |
| 2,046,050 | 6/1936 | Aubort | 179/78 R |
| 3,551,858 | 12/1970 | Cielo | 178/45 X |
| 2,934,721 | 4/1960 | De Long | 333/25 X |
| 1,942,488 | 1/1934 | Och | 333/5 |
| 2,196,673 | 4/1940 | Gutzmann | 333/25 |
| 2,265,067 | 12/1941 | Ellestad | 333/25 |
| 2,272,452 | 2/1942 | Whittle | 333/12 X |
| 2,542,915 | 2/1951 | Favre | 333/25 |
| 3,223,920 | 12/1965 | Sasaki | 333/25 X |
| 2,026,308 | 12/1935 | Ganz | 333/12 X |

*Primary Examiner*—Rudolph V. Rolinec
*Assistant Examiner*—Marvin Nussbaum
*Attorney*—R. J. Guenther et al.

[57] ABSTRACT

A coupler exhibiting substantially improved insertion loss performance comprises a split winding transformer, an inductor network, and a capacitor network. The coupler longitudinally balances voiceband signals derived from a grounded source for transmission along a balanced cable pair and simultaneously provides metallic circuit continuity between the source and the cable pair for superimposed direct current (DC) and low frequency signaling. The transformer inductively transfers voiceband signals via its windings and, further, by having associated winding sections along the tip and ring connected series opposed, allows for the transfer of DC and low frequency signals without impairment of voiceband transmission. The inductor network provides metallic circuit continuity between the transformer windings to effect this transfer of DC and low frequency signals and, in addition, suppresses the longitudinal voiceband signal components.

7 Claims, 9 Drawing Figures

COMBINED VOICE FREQUENCY TRANSMISSION AND DC SIGNALING CIRCUIT

FIELD OF THE INVENTION

This invention relates to transmission couplers which connect a grounded source to a balanced cable pair and in particular to such couplers which additionally provide metallic circuit continuity between the source and the cable pair for superimposed direct current and low frequency signaling.

BACKGROUND OF THE INVENTION

The need for circuits which couple terminal equipment and balanced cable facilities is well recognized. This need is of paramount importance when the terminal equipment, such as privately owned customer equipment, would otherwise impair the normal operation of such facilities. For instance, such a coupler must not introduce substantial insertion loss. In cases where the terminal equipment transmits voiceband (300–3000 Hz) as well as direct current (DC) and low frequency ( $< 20$ Hz) signals, the coupler must properly condition these signals for transmission along the balanced cable facilities. This must be accomplished even when the terminal equipment is a grounded or unbalanced source.

In addition to providing satisfactory signal transmission, the coupler must also facilitate the connection of the terminal equipment to the balanced cable facilities, such as by requiring a minimum number of input and output terminal connections. Present coupler requirements permit only two-wire input and output connections.

It is therefore the primary object of the present invention to connect terminal equipment to balanced cable facilities without introducing substantial insertion loss.

It is another object of this invention to properly condition terminal equipment source signals for transmission along balanced cable facilities.

It is a further object of this invention to allow for balanced voiceband transmission, independent of the degree of terminal equipment unbalance, and for superimposed DC and low frequency signaling.

It is a still further object of this invention to facilitate the connection of terminal equipment to the balanced cable facilities.

SUMMARY OF THE INVENTION

According to the present invention, a coupler longitudinally balances voiceband signals derived from a grounded source for transmission along a balanced cable pair and simultaneously provides metallic circuit continuity between the source and the cable pair for superimposed direct current (DC) and low frequency signaling. The coupler substantially comprises a transformer having split primary and secondary windings wherein associated winding sections along the tip and ring are connected series opposed, an inductor network having two coils connected series opposed on a common core wherein each coil serially connects associated primary and secondary winding sections located along the tip and ring, and a capacitor network including two capacitors having their common node grounded and being serially interposed within the split secondary winding.

According to a specific embodiment of the present invention, the transformer has a turns ratio of 1 while its windings are wound on a permalloy core in order to provide a high value of low frequency inductance and thereby improve low frequency envelope delay distortion performance.

It is an advantage of the present invention that it facilitates the connection of terminal equipment to the balanced cable facilities.

It is another advantage of this invention that use of a permalloy core yields improved low frequency envelope delay distortion performance while requiring a relatively small space.

It is a feature of the present invention that it longitudinally balances voiceband signals, independent of the degree of terminal equipment unbalance, and simultaneously provides metallic circuit continuity for superimposed DC and low frequency signaling while requiring only two input and two output terminal connections.

It is another feature of this invention that it simultaneously exhibits substantially improved longitudinal balance and insertion loss performance.

DESCRIPTION OF THE DRAWING

The above and other objects, advantages, and features of this invention will be better appreciated by a consideration of the following detailed description and the drawing in which:

FIG. 1A illustrates a conventional transmission arrangement wherein the terminal equipment is connected via a coupler to associated cable facilities, while

DETAILED DESCRIPTION

Figure 1A:
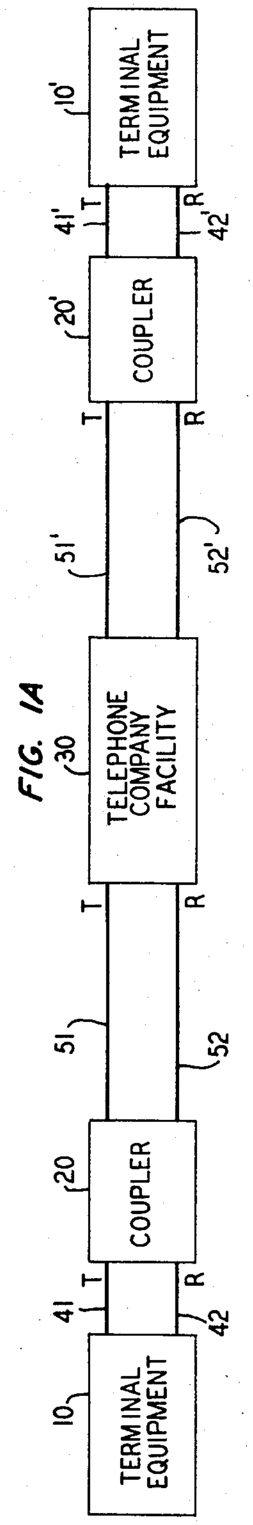

Referring to FIG. 1A, there is shown a conventional transmission arrangement wherein coupler 20 serves as an interface between terminal equipment (TE) 10 and telephone company facility 30 while coupler 20′ serves as an interface between TE10′ and the same facility. Further, wires 41 and 42 connect TE10 to coupler 20 while balanced cable pair 51–52 connects coupler 20 to facility 30. Similarly, wires 41′ and 42′ connect TE10′ to coupler 20′ while balanced pair 51′–52′ connects coupler 20′ to facility 30. In conventional manner, wires 41 and 41′ and lines 51 and 51′ are designated tip-side conductors whereas wires 42 and 42′ and lines 52 and 52′ are designated ring-side conductors.

Couplers such as 20 and 20′ protect the telephone company plant and the terminal equipment, even though privately owned, from external detrimental effects and allow for diversified operation of the terminal equipment. The coupler protection circuitry provides lightning protection, variolosser control, etc. Such protection circuitry is not the subject of this invention and thus will not be further discussed herein. In addition, the coupler contains means for converting the terminal equipment source signals into a format compatible with balanced cable facility transmission requirements. The need for suppressing the longitudinal components of the voiceband signals which are to be transmitted over balanced cable facilities is well recognized and thus will not be further discussed.

In certain cases, the coupler is required to longitudinally balance voiceband signals derived from grounded terminal equipment while simultaneously providing adequate insertion loss, envelope delay distortion, and pulse distortion performance. Another important coupler requirement is that it allow for direct current (DC) and low frequency signaling. In addition to satisfying these transmission criteria, the coupler must also facilitate the connection of the terminal equipment to the balanced cable facilities, such as by requiring a minimum number of input and output terminal connections. For instance, present standards require two-wire input and two-wire output terminal connections.

The use of balanced cable pairs for connecting terminal equipment to telephone company facilities is expected to continue thereby extending the present need for couplers of the type herein described.

Figure 1B:
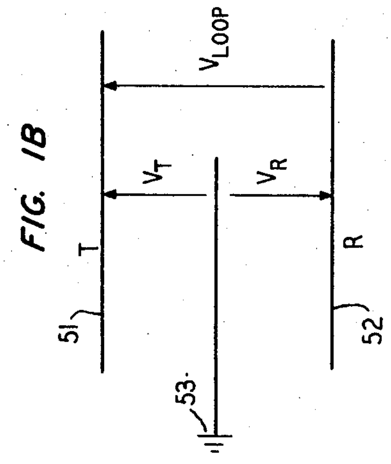
FIG. 1B is used in defining loop and longitudinal signals.

Referring now to FIG. 1B, loop voltage is defined as:

$$V_{loop} = V_T - V_R\,, \qquad (1)$$

while longitudinal voltage is defined as:

$$V_{long} = (V_T + V_R)/2, \qquad (2)$$

where $V_T$ and $V_R$ respectively represent the voltages from lines 51 and 52 to ground 53. Signal transmission in cable pair 51–52 is said to be purely balanced if $$V_T = -V_R \neq 0\,, \qquad (3)$$

in which case $$V_{loop} = 2V_T\,, \qquad (4)$$

and $$V_{long} = 0\,. \qquad (5)$$

Similarly, signal transmission in cable pair 51–52 is said to be purely longitudinal if $$V_T = V_R \neq 0, \qquad (6)$$

in which case $$V_{loop} = 0, \qquad (7)$$

and $$V_{long} = V_T. \qquad (8)$$

In light of the above, a signal occurring on cable pair 51–52 is a balanced voiceband signal when it has a frequency range of 300 to 3000 Hz and when it satisfies the voltage relations given by equation (3). Secondly, in the general unbalanced situation, of which equation (6) depicts a special case, $V_{loop} \neq 0$ and $V_{long} \neq 0$. This occurs, for instance, at the coupler's input terminals when wire 42 is grounded, i.e., $V_R = 0$, in which case $V_{loop} = V_T$ and $V_{long} = V_T/2$. This second special case is further discussed with respect to FIGS. 3B and 4B.

Referring to equations (3) and (6), it is apparent that $V_{loop}$ tends to cause equal and opposite current flow in lines 51 and 52 while $V_{long}$ tends to cause equal but unidirectional current flow along lines 51 and 52.

Since cable pair 51–52 is designed to be physically balanced thereby allowing for the transmission of longitudinally balanced voiceband signals, any initially unbalanced voiceband signals derived from TE10, for instance, must be converted by coupler 20 to the balanced format. It should be noted, however, that in practical devices the longitudinal voiceband signal components are never completely suppressed; in other words, $V_{long}$ within the cable pair is never absolute zero. Since longitudinal balance is measured in terms of the relative values of $V_{i\ long}$ on the coupler's input side and $V_{o\ long}$ on the coupler's output side, it is therefore required that the ratio $V_{i\ long}/V_{o\ long}$ be maximized.

Figure 2:
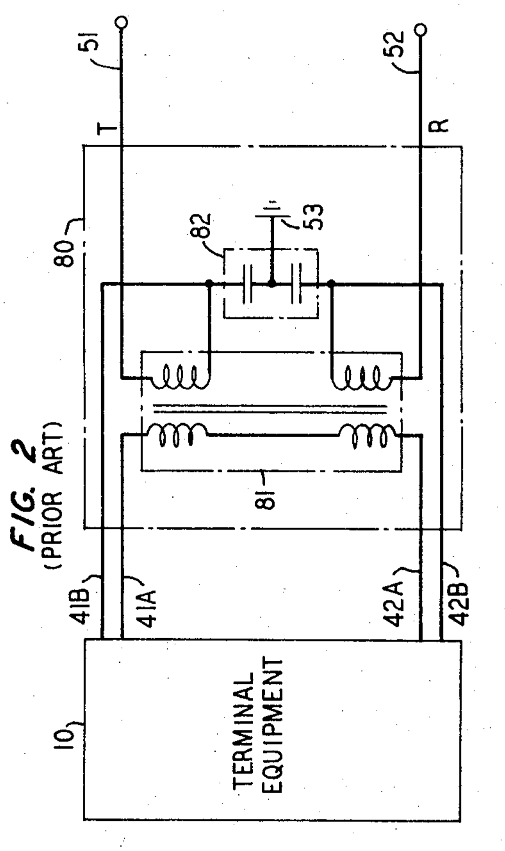
FIG. 2 (PRIOR ART)
FIG. 2 illustrates a first coupler of the prior art.

One prior art coupler which longitudinally balances voiceband signals and which simultaneously provides for DC and low frequency signaling is shown in FIG. 2. Coupler 80 substantially comprises transformer 81 and grounded capacitor network 82. In this arrangement, the unbalanced voiceband signals are applied to a first pair of coupler input terminals by way of wires 41A and 42A, while the DC and low frequency signals are applied to a second pair of input terminals by way of wires 41B and 42B. Wires 41A and 42A are associated with the transformer's primary winding, while wires 41B and 42B are associated with the secondary winding. The balanced voiceband signals and the DC and low frequency signals appear at the coupler's output terminals which connect to balanced pair 51–52. The operation of coupler 80 is well known, and thus, will not be discussed herein. It is apparent that prior art coupler 80 requires four input terminal connections and therefore does not meet present coupler interconnection standards.

Figure 3A:
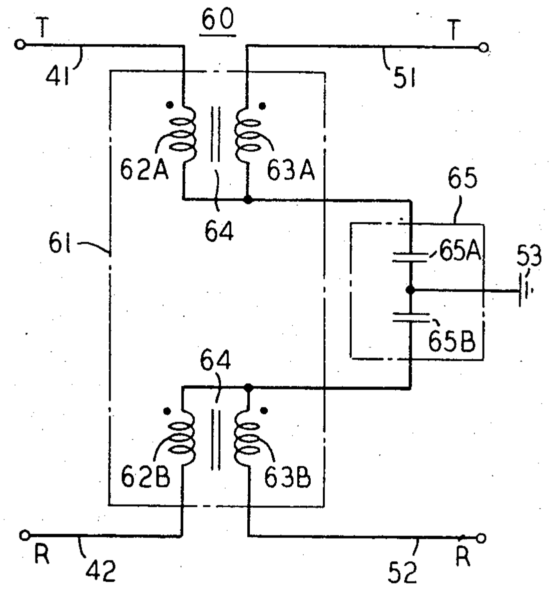
FIG. 3A (PRIOR ART)
FIGS. 3A and 3B respectively illustrate a second coupler of the prior art and its idealized voiceband equivalent circuit.

One prior art coupler which longitudinally balances voiceband signals and which simultaneously provides metallic circuit continuity between its two input and two output terminals for superimposed DC and low frequency signaling is shown in FIG. 3A. Coupler 60 substantially comprises split-winding transformer 61 and grounded capacitor network 65. Transformer 61 includes a split primary winding which is made up of winding sections 62A and 62B, a split secondary winding which is made up of winding sections 63A and 63B, and core 64. Primary winding sections 62A and 62B are connected series aiding on core 64, while secondary winding sections 63A and 63B are also connected series aiding. Capacitor network 65 includes capacitor 65A, which connects the common node of sections 62A and 63A to ground 53, and capacitor 65B, which similarly connects the common node of sections 62B and 63B. Further, wires 41 and 42 connect to the coupler's two input terminals which comprise the outer ends of sections 62A and 62B while balanced pair 51–52 connect to the coupler's two output terminals which comprise the outer ends of sections 63A and 63B.

Figure 3B:
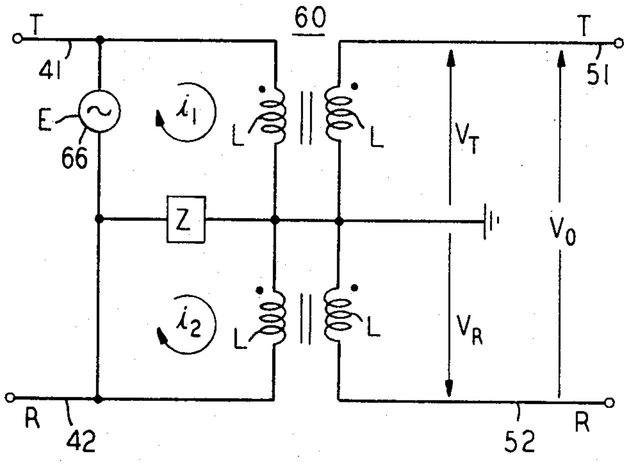

It is now shown with reference to FIG. 3B that while coupler 60 provides balanced voiceband signals at its two output terminals, its insertion loss performance is inadequate. Insertion loss, of course, refers to the attenuation of signals which results from the mere addition of the coupler as an interface between the terminal equipment and the telephone company facility. In FIG. 3B, which illustrates an idealized voiceband equivalent circuit of coupler 60, it has been assumed that grounded capacitors 65A and 65B act substantially as short circuit elements over the voiceband, that transformer 61 is ideal, and that the internal resistance of source 66 is negligible. Transformer 61 is said to be ideal when it has a turns ratio of 1 and when its windings exhibit a negligible static resistance. In the figure, impedance Z, which connects one side of source 66 to ground 53, represents the degree of balance of the source. In other words, when Z equals zero, the associated side of source 66 is grounded thereby making source 66 unbalanced. It is apparent that source 66 is connected across the coupler's two input terminals.

Now, applying well-known circuit analysis techniques, the loop equations for this equivalent circuit are:

$$E = i_1[Ls+Z(s)] + i_2[Ls-Z(s)], \quad (9)$$

and $$0 = i_1[Ls-Z(s)] + i_2[Ls+Z(s)], \quad (10)$$

where $E$ is the source voltage, $i_1$ and $i_2$ are the loop currents, $L$ is the inductance of the winding sections, and $s$ is the generalized frequency parameter. Ideal inductive coupling is assumed, thereby making the mutual inductances also equal to $L$. The determinant D of equations (9) and (10) is therefore:

$$D = \begin{vmatrix} Ls+Z(s) & Ls-Z(s) \\ Ls-Z(s) & Ls+Z(s) \end{vmatrix} \quad (11)$$

$$= [Ls+Z(s)]^2 - [Ls-Z(s)]^2, \quad (12)$$

$$= 4LsZ(s). \quad (13)$$

Using equation (13), the expressions for $i_1$ and $i_2$ are:

$$i_1 = \frac{\begin{vmatrix} E & Ls-Z(s) \\ O & Ls+Z(s) \end{vmatrix}}{D} \quad (14)$$

$$= E\,[Ls+Z(s)]/(4Ls\,Z(s)), \quad (15)$$

and $$i_2 = \frac{\begin{vmatrix} Ls+Z(s) & E \\ Ls-Z(s) & O \end{vmatrix}}{D} \quad (16)$$

$$= -E\,[Ls-Z(s)]/[4Ls\,Z(s)]. \quad (17)$$

Using equations (15) and (17), and again assuming that mutual inductive coupling exists, the open circuit output voltage $V_O$ across balanced pair 51–52 is:

$$V_O = V_T - V_R = Ls[(i_1+i_2) + (i_1+i_2)]$$

$$= 2Ls\,(i_1+i_2), \quad (18)$$

$$= \frac{2LsE}{4LsZ(s)}\{[Ls+Z(s)] - [Ls-Z(s)]\} \quad (19)$$

$$= E. \quad (20)$$

It is therefore apparent that open circuit output voltage $V_O$ is theoretically equal to source voltage $E$. However, equation (15) indicates that as the impedance to ground $Z$ on one side of generator 66 approaches zero, loop current $i_1$ theoretically approaches infinity. Since the transformer windings and the source do, in fact, exhibit some finite resistance, current $i_1$ does not approach infinity but still increases to an excessive value. This, of course, results in excessive dissipation of useful energy in the transformer windings and in the internal generator resistances. Therefore, even though $V_O$ is substantially balanced over the voiceband, i.e., $V_T = -V_R \neq 0$, when source 66 is grounded, the excessive values of the loop currents yield substantial voltage drops across these internal resistances. This, in turn, results in unacceptable insertion loss performance. For example, when coupler 60 is connected between a 600 ohm source and a 600 ohm load, the longitudinal balance at 1000 Hz is in excess of 20 db but the insertion loss at 1000 Hz is approximately 25 db, which is generally unacceptable.

Figure 4A:
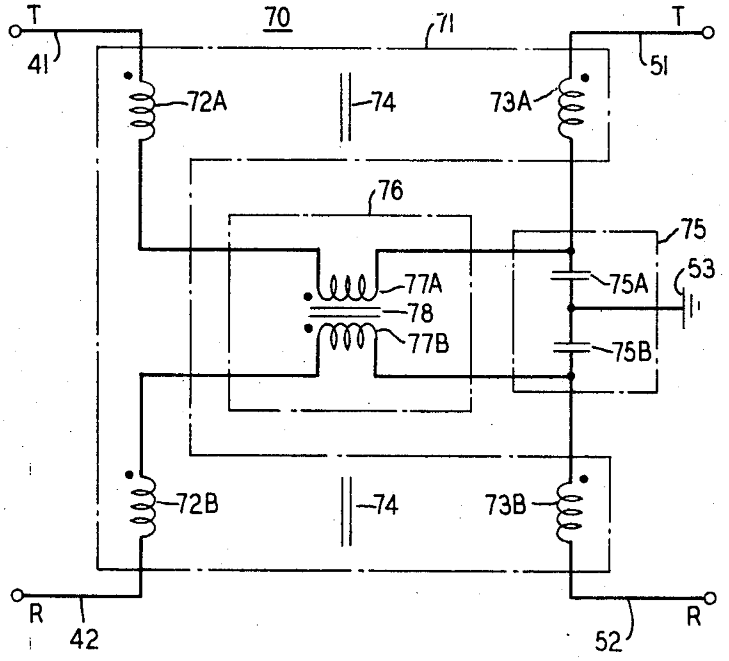
FIGS. 4A and 4B respectively illustrate a coupler according to the present invention and its idealized voiceband equivalent circuit, while FIGS. 4C and 4D respectively illustrate the use of this coupler for unidirectional loop direct current (DC) and low frequency signaling and for bidirectional longitudinal DC and low frequency signaling.

A coupler according to the present invention which longitudinally balances voiceband signals, which simultaneously provides metallic circuit continuity between its two input and two output terminals for superimposed DC and low frequency signaling, and, further, which exhibits substantially improved insertion loss performance, is shown in FIG. 4A. The insertion loss characteristics of coupler 70 are discussed more fully with reference to FIG. 4B. Coupler 70 substantially comprises split-winding transformer 71, inductor network 76, and grounded capacitor network 75.

According to the present invention, inductor network 76 includes inductor coils 77A and 77B connected series opposed on core 78. These coils can advantageously be two identical sections of a single-coil inductor. Further, transformer 71 includes a split primary winding which is made up of winding sections 72A and 72B, a split secondary winding which is made up of winding sections 73A 73B, and core 74. Primary winding sections 72A and 72B are identical and connected series aiding while secondary winding sections 73A and 73B are also identical and connected series aiding. Finally, capacitor network 75 includes serially connected capacitors 75A and 75B which have their common node connected to ground 53. Capacitors 75A and 75B are of equal value.

Inductor coil 77A serially connects winding sections 72A and 73A, while coil 77B serially connects winding sections 72B and 73B, thereby providing metallic circuit continuity between the transformer's primary and secondary windings. The outer ends of primary winding sections 72A and 72B, which connect to wires 41 and 42, comprise the coupler's two input terminals, while the outer ends of secondary winding sections 73A and 73B, which connect to balanced pair 51–52, comprise the coupler's two output terminals. Further, the common node of section 73A and coil 77A connects to capacitor 75A, while the common node of section 73B and coil 77B connects to capacitor 75B. According to the present invention, the unbalanced voiceband signals are applied to the coupler's two input terminals while the balanced voiceband signals appear at the coupler's two output terminals.

A coupler such as that heretofore described having a secondary midpoint ground but not including capacitors 75A and 75B provides for longitudinally balanced voiceband signal transmission with improved insertion loss performance. Generally, transformer 71 transfers the voiceband signals from its primary winding to its secondary winding while inductor network 76 suppresses any longitudinal voiceband signal components. In particular, inductor coil 77B, which is part of the loop including normally grounded primary winding section 72B and ground 53, generates the fluxes necessary to suppress the longitudinal voiceband signal components passing through inductor coil 77A. At this point, neither the transformer turns ratio nor the type of series connection between the associated primary and secondary winding sections has been specified.

Now, a coupler such as that heretofore described including capacitors 75A and 75B provides not only for longitudinally balanced voiceband signal transmission with improved insertion loss performance, but also provides for DC and low frequency signaling via the metallic circuit path which connects the coupler's two input and two output terminals. In this case, capacitor network 75 acts substantially as a short circuit element to the voiceband signals and as an open circuit element to the DC and low frequency signals. Therefore, the operation of the coupler in the voiceband range is substantially the same as that explained above. Again, neither the transformer turns ratio nor the type of series connection between the associated primary and secondary winding sections has been specified.

Generally, transformer windings are susceptible to DC saturation. This, of course, causes a decrease in the nominal winding inductance thereby resulting in less efficient voiceband signal transmission. Therefore, in order to permit the transfer of DC and low frequency signals via the metallic path which connects the coupler's two input and two output terminals and at the same time maintain the nominal efficiency of voiceband transmission, winding sections 72A and 73A located along the tip conductor and winding sections 72B and 73B located along the ring conductor are respectively connected series opposed. Therefore, currents flowing in these associated primary and secondary winding sections produce equal and opposite DC fluxes which cancel each other thereby stabilizing the winding inductance at its nominal value.

The coupler configurations heretofore described could advantageously utilize iron core transformers. However, according to a further specific embodiment of the present invention, transformer 71 has a turns ratio of 1 and includes a permalloy core. The resulting structure provides a high value of low frequency inductance which is required for distortionless DC dial pulse transmission along the above-mentioned metallic path. It should be noted that permalloy core transformers occupy relatively little space. In one actual embodiment of coupler 70 which included a permalloy core, DC dial pulses were transmitted at rates of up to 20 pulses per second with a resulting distortion of only 8 percent.

Figure 4B:
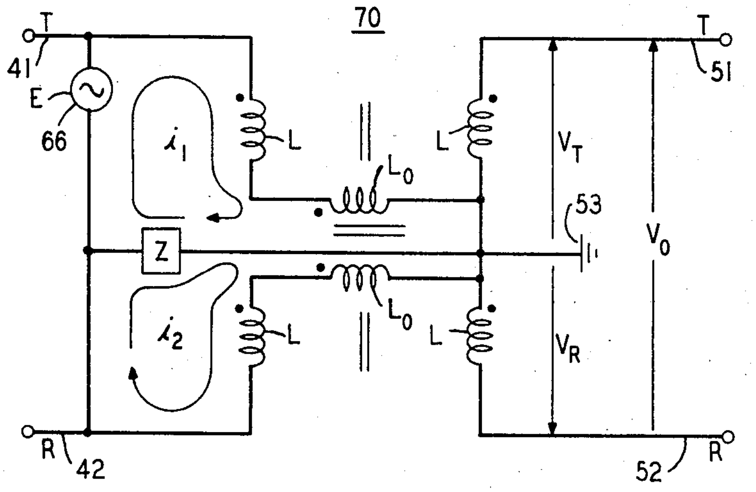

It is now shown with reference to the idealized voiceband equivalent circuit of FIG. 4B that coupler 70 provides for longitudinally balanced voiceband signal transmission with substantially improved insertion loss performance. Again, it is assumed that the grounded capacitors act substantially as short circuit elements over the voiceband, that the transformer is ideal, and that the internal resistance of source 66 is negligible. Impedance $Z$ represents the degree of balance of source 66. It is apparent that source 66, whose output voltage is designated as $E$, is connected across the coupler's two input terminals while balanced pair 51–52 is connected across the coupler's two output terminals.

Proceeding as before, the loop equations for this equivalent circuit are:

$$E = i_1[Ls+L_0s+Z(s)] + i_2[Ls-L_0s-Z(s)], \quad (21)$$

$$0 = i_1[Ls-L_0s-Z(s)] + i_2[Ls+L_0s+Z(s)], \quad (22)$$

where $i_1$ and $i_2$ represent the loop currents, L is the inductance of the winding sections, $L_0$ is the inductance of the inductor coils, and $s$ is the generalized frequency parameter. Again, ideal inductive coupling is assumed. The determinant $D$ of equations (21) and (22) is therefore given by:

$$D = \begin{vmatrix} Ls+L_0s+Z(s) & Ls-L_0s-Z(s) \\ Ls-L_0s-Z(s) & Ls+L_0s+Z(s) \end{vmatrix} \quad (23)$$

$$= [Ls+L_0s+Z(s)]^2 - [Ls-L_0s-Z(s)]^2, \quad (24)$$

$$= 4Ls[L_0s+Z(s)]. \quad (25)$$

Using D, the expressions for $i_1$ and $i_2$ are:

$$i_1 = \frac{\begin{vmatrix} E & Ls-L_0s-Z(s) \\ O & Ls+L_0s+Z(s) \end{vmatrix}}{D} \quad (26)$$

$$= \frac{E[Ls+L_0s+Z(s)]}{4Ls[L_0s+Z(s)]} \quad (27)$$

and $$i_2 = \frac{\begin{vmatrix} Ls+L_0s+Z(s) & E \\ Ls-L_0s-Z(s) & O \end{vmatrix}}{D} \quad (28)$$

$$= \frac{E[Ls-L_0s-Z(s)]}{4Ls[L_0s+Z(s)]} \quad (29)$$

Using the expressions for $i_1$ and $i_2$ and assuming ideal inductive coupling, the open circuit output voltage $V_O$ is:

$$V_O = V_T - V_R = Ls\,[(i_1+i_2) + (i_1+i_2)]$$

$$= 2Ls(i_1+i_2), \quad (30)$$

$$= 2Ls\,E\,[Ls+L_0s+Z(s)-Ls+L_0s+Z(s)]\,/\,4Ls\,[L_0s+Z(s)] \quad (31)$$

$$=E. \quad (32)$$

Again, the open circuit output $V_O$ is theoretically equal to source voltage $E$. In this case, however, instead of current $i_1$ theoretically approaching infinity as the impedance to ground Z of source 66 approaches zero, the current approaches a finite value which is determined by the parallel impedance of $L$ and $L_0$. Since the transformer windings and the source do exhibit some finite resistance, current $i_1$ increases to an acceptable finite value which does not lead to substantial voltage drops across these internal resistances. Therefore, not only is $V_O$ balanced, i.e., $V_T=-V_R \neq 0$, even when the source is grounded, but also the insertion loss is substantially reduced. When coupler 70 is connected between a 600 ohm source and a 600 ohm load, the longitudinal balance throughout the voiceband is in excess of 32 db, while the insertion loss at 1000 Hz is only 0.8 db thereby yielding substantially improved insertion loss performance.

Figure 4C:
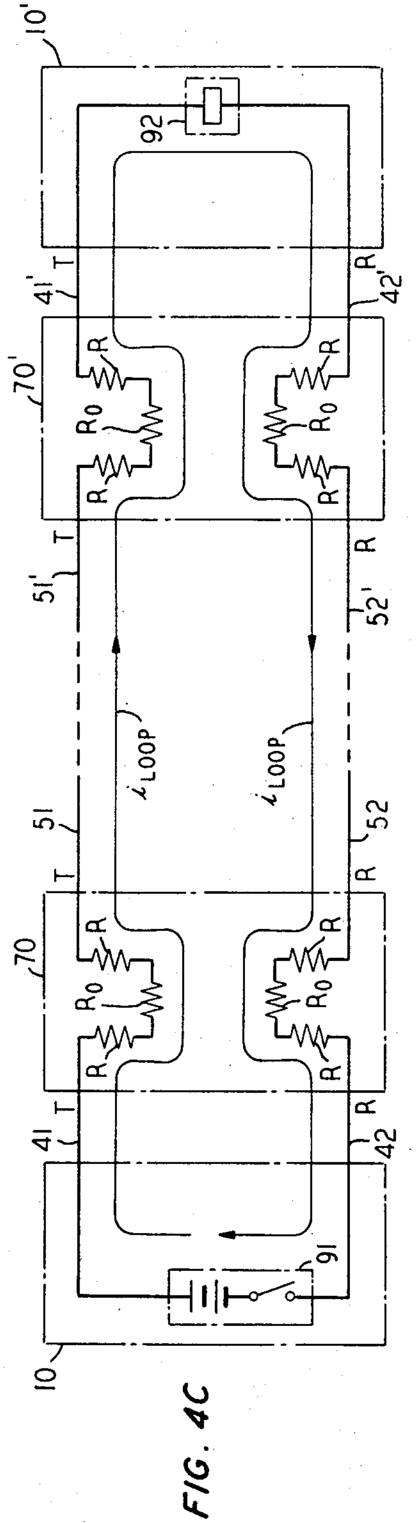

Referring now to FIG. 4C, there are shown DC equivalent circuits of couplers 70 and 70' wherein metallic circuit continuity is utilized for unidirectional loop DC and low frequency signaling from TE10 to TE10', otherwise known as metalic loop signaling. In this case, grounded capacitors 75A and 75B act substantially as open circuit elements, while the transformer windings and inductor coils act substantially as resistances with values R and $R_0$, respectively. For illustrative purposes, TE10 and TE10', respectively, include ungrounded battery-switch combination 91 and current sensitive relay 92, which responds to the opening and closing of the switch. It is apparent that a clockwise current $i_{loop}$ flows from TE10 to TE10' along the tip side and flows from TE10' to TE10 along the ring side. Specific applications of this arrangement and methods of connecting associated voice-band terminal equipment thereto are well known in the art and, therefore, will not be discussed herein.

Figure 4D:
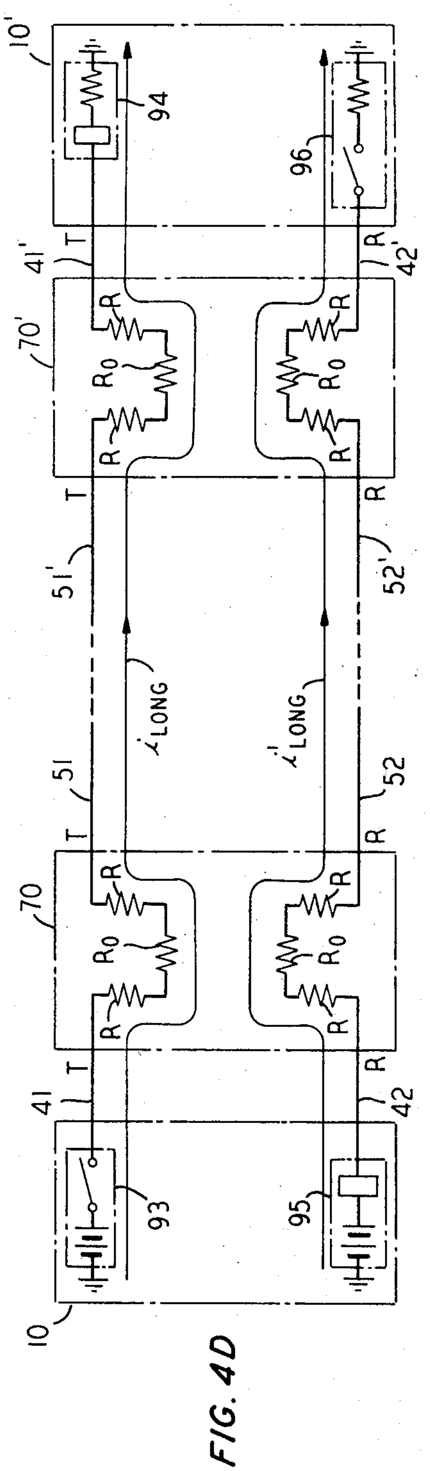

Referring now to FIG. 4D, there are shown further DC equivalent circuits of couplers 70 and 70' wherein metallic circuit continuity is utilized for bidirectional longitudinal DC and low frequency signaling between TE10 and TE10', otherwise known as composite signaling. Again, the grounded capacitors act substantially as open circuit elements, while the transformer windings and inductor coils act substantially as resistances. For illustrative purposes, TE10 and TE10', respectively, include grounded battery-switch combination 93 and grounded resistor-current sensitive relay combination 94 for signaling from TE10 to TE10'. Similarly, TE10' and TE10, respectively, include analogous elements 96 and 95 for signaling from TE10' to TE10. In this case, a first current $i_{long}$ flows from TE10 to TE10' along the tip side while a second independent current $i'_{long}$ flows from TE10 to TE10' along the ring side. A ground return path is provided for both currents. Again, specific applications of this arrangement and methods of connecting associated voiceband terminal equipment thereto are well known and, therefore, will not be discussed herein.

In addition to the applications heretofore described, the coupler of the present invention can be utilized for reducing noise due to inherent central office unbalance and induced longitudinal signal interference where existing arrangements do not provide the necessary longitudinal signal suppression. Such applications are also not discussed herein.

While the arrangement according to the present invention for coupling an unbalanced or grounded source to a balanced cable pair has been described in terms of specific embodiments, it will be apparent to those skilled in the art that many modifications are possible within the spirit and scope of the described principle.

What is claimed is:

1. A coupler for longitudinally balancing voice-band signals applied to its two input terminals and for providing the balanced signals at its two output terminals, said coupler comprising:

a transformer including first and second identical primary winding sections connected series aiding and wound on a first core and first and second identical secondary winding sections also connected series aiding and wound on said first core, the inner ends of said secondary winding sections being connected to a reference potential, said input and output terminals respectively comprising the outer ends of said primary and secondary winding sections; and an inductor network including first and second coils connected series opposed and wound on a second core, each coil connecting associated inner ends of said primary and secondary winding sections whereby the first primary winding section, the first coil, and the first secondary winding section are connected in series, and the second primary winding section, the second coil, and the second secondary winding section are also connected in series, the voiceband signals appearing at said two output terminals being substantially balanced with respect to said reference potential.

2. The coupler of claim 1 also comprising a capacitor network for connecting the inner ends of said secondary winding sections to said reference potential, said coupler now being capable of also transmitting DC and low frequency signals via the metallic path comprising said primary winding sections, said inductor network, and said secondary winding sections.

3. The coupler of claim 2 wherein said capacitor network includes first and second serially connected capacitors, each capacitor connecting an associated inner end of said secondary winding sections to said reference potential.

4. The coupler of claim 2 wherein said first winding sections are connected series opposed and said second winding sections are also connected series opposed.

5. The coupler of claim 4 wherein said first core is of the permalloy type, said coupler exhibiting substantially improved pulse distortion performance.

6. A coupler for longitudinally balancing applied voiceband signals, said coupler comprising:

transformer means further comprising split primary and secondary windings, the outer ends of said primary winding being responsive to said applied voiceband signals and the inner ends of said secondary winding being connected to reference potential; and inductor means further comprising first and second coils wound on a common core, each coil connecting an associated inner end of said primary winding to an associated inner end of said secondary winding, the voiceband signals appearing at the outer ends of said secondary winding being substantially balanced with respect to said reference potential.

7. The coupler of claim 6 also comprising capacitor means for connecting the inner ends of said secondary winding to said reference potential, said coupler now being capable of also transmitting DC and low frequency signals via the metallic path comprising said primary winding, said inductor means, and said secondary winding.

* * * * *